United States Patent [19]

Kobayashi et al.

[11] Patent Number: 4,778,525

[45] Date of Patent: Oct. 18, 1988

[54] RECORDING LIQUID

[75] Inventors: Masatsune Kobayashi; Tsuyoshi Eida, both of Yokohama; Makoto Shioya, Tokyo, all of Japan

[73] Assignee: Canon Kabushiki Kaisha, Tokyo, Japan

[21] Appl. No.: 30,294

[22] Filed: Mar. 23, 1987

Related U.S. Application Data

[63] Continuation of Ser. No. 794,147, Nov. 1, 1985, abandoned.

[30] Foreign Application Priority Data

Nov. 8, 1984 [JP] Japan .................................. 59-234207

[51] Int. Cl.$^4$ ............................................. C09D 11/00
[52] U.S. Cl. ......................................... 106/20; 106/22
[58] Field of Search .................................... 106/20, 22

[56] References Cited

U.S. PATENT DOCUMENTS

| | | | |
|---|---|---|---|
| 4,299,630 | 11/1981 | Hwang | 106/22 |
| 4,373,954 | 2/1983 | Eida et al. | 106/20 |
| 4,664,815 | 5/1987 | Ozawa et al. | 210/96.1 |

*Primary Examiner*—Theodore Morris
*Attorney, Agent, or Firm*—Fitzpatrick, Cella, Harper & Scinto

[57] ABSTRACT

A liquid composition is provided which contains a water-soluble dye and a solvent, wherein said liquid composition has a lyophobic colloid concentration of 13 ppm or less. An ink-jet recording method is also provided which employs an ink comprising the liquid composition.

10 Claims, No Drawings

RECORDING LIQUID

This application is a continuation of application Ser. No. 794,147 filed Nov. 1, 1985, now abandoned.

BACKGROUND OF THE INVENTION

1. Field of the Invention

The present invention relates to recording liquids (hereinafter referred to as inks) for making records on recording media such as paper, resin films, and the like by using an ink-jet system or a writing tool such as a fountain pen, felt pen, or the like.

2. Description of the Prior Art

An ink-jet recording system comprises forming ink droplets by any of various ink-discharging techniques and causing a portion or all of the droplets to deposit onto a recording medium such as paper or the like, to carry out recording. Inks known and used for the ink-jet recording system are solutions or dispersions of various water-soluble dyes or pigments in vehicles such as water and mixtures of water with water-soluble organic solvents.

Similar inks are also employed for recording with writing tools such as fountain pens, felt pens, and ball pens.

A variety of performance characteristics are naturally required for these inks. The most strongly required characteristic is stability of the liquid against occurrence of deposit that may clog a nozzle or an orifice of a recorder or a pen point during recording or after short-time or long-term intermission. This characteristic is specially important for thermally actuated ink-jet recording system, since temperature changes tend to cause deposition of a foreign matter on the surface of the heating heads. However, inks of prior arts need some additives in order to satisfy various requirements in respect of the conditions of ink discharge, long-term storage stability of inks, distinctness and optical density of recorded images, surface tension and electrical properties of inks, etc. Moreover, the prior art inks involve a number of problems such that the nozzles and orifices of ink-jet recorders may clog, deposits may develop on the surface of the heating heads, and precipitates may appear during long-term storage due to various impurities contained in the used dyes. This is one of the reasons why ink-jet recording systems do not rapidly come into wider use in spite of their many superior features.

SUMMARY OF THE INVENTION

The primary object of the invention is to provide inks which will overcome the above noted shortcomings of prior art inks and have such superior stability as not to cause clogging of the nozzles or orifices and in particular not to deposit foreign matter on the heating heads of ink-jet recorders wherein thermal energy is utilized.

According to one aspect of the invention, there is provided a liquid composition containing a water-soluble dye and a solvent, wherein said liquid composition has a lyophobic colloid concentration of 13 ppm or less.

According to another aspect of the invention, there is provided an ink-jet recording method wherein the above-mentioned ink is used.

According to another aspect of the invention, there is provided an ink-jet recording method comprising forming droplets of an ink to perform recording, said ink comprising a liquid composition containing a water soluble dye and a solvent, wherein said liquid composition has a lyophobic colloid concentration of 13 ppm or less.

According to further aspect of the invention, there is provided a color ink-jet recording method comprising forming droplets of a plurality of color inks to perform recording, each of the color inks comprising a liquid composition containing a water-soluble dye and a solvent, wherein said liquid composition has a lyophobic colloid concentration of 13 ppm or less.

DETAILED DESCRIPTION OF THE PREFERRED EMBODIMENTS

Comprehensive studies were made by the present inventors to achieve the above object, it was found that the foregoing problems arise mainly from a variety of impurities (organic compounds, e.g. dispersants and levelling agents, and inorganic compounds) contained in the commercial dyes used for inks. From the further study of various adverse effects of these impurities, it was found that a variety of lyophobic colloids contained in inks are largely responsible for clogging of the nozzles or orifices, the formation of precipitates during storage of inks, and in particular the deposition of foreign matter on the heating heads in the ink-jet recording system utilizing thermal energy. Based on the above finding, the present invention has been accomplished.

Hereinafter the invention is described in more detail.

The fundamental components per se constituting the ink of the invention are already known. One of these components is a water-soluble dye, typical examples thereof are direct dyes, acid dyes, basic dyes, and reactive dyes. Of these dyes, those specially suitable as components of the inks for ink-jet recording and satisfactory in water-solubility, stability, light resistance, distinctness of recorded images, and other required properties are, for example; C.I. Direct Black 17, 19, 32, 51, 71, 108, and 146; C.I. Direct Blue 6, 22, 25, 71, 86, 90, 106, and 199; C.I. Direct Red 1, 4, 17, 28, and 83; C.I. Direct Yellow 12, 24, 26, and 98; C.I. Direct Orange 34, 39, 44, 46, and 60; C.I. Direct Violet 47, and 48; C.I. Direct Brown 109; C.I. Direct Green 59; C.I. Acid Black 2, 7, 24, 26, 31, 52, 63, 112, and 118; C.I. Acid Blue 9, 22, 40, 59, 93, 102, 104, 113, 117, 120, 167, 229, and 234; C.I. Acid Red 1, 6, 32, 35, 37, 51, 52, 80, 85, 87, 92, 94, 115, 180, 256, 317, and 315; C.I. Acid Yellow 11, 17, 23, 25, 29, 42, 61, and 71; C.I. Acid Orange 7, and 19; C.I. Acid Violet 49; C.I. Basic Black 2; C.I. Basic Blue 1, 3, 5, 7, 9, 24, 25, 26, 28, and 29; C.I. Basic Red, 1, 2, 9, 12, 13, 14, and 37; C.I. Basic Violet 7, 14, and 27; and C.I. Food Black 2. The above examples are particularly preferred dyes in the present invention but do not restrict it.

Such water-soluble dyes are used generally in concentrations of about 0.1 to 20% by weight in the prior art inks. In the present invention, these dyes can be incorporated in inks not only in the above-mentioned concentration range but also in higher concentrations on the basis of the discovery of the present invention, that is, inks of the invention even at such high dye concentrations are superior in liquid stability to inks of the prior art and form no precipitate.

The liquid medium used in the ink of the present invention is water or preferably a mixture of water with a water-soluble organic solvent such as a polyhydric alcohol exhibiting effect of preventing inks from drying. The water used herein is not usually used water containing various ions but deionized water. Suitable water-soluble solvents for use in mixture with water are; $C_1$–$C_4$ alkyl alcohols, e.g. methanol, ethanol, n-propanol, isopropanol, n-butanol, sec-butanol, tert-butanol, and isobutanol; amides, e.g. dimethylformamide and dimethylacetamide; ketones or keto-alcohols, e.g. acetone and diacetone alcohol; ethers, e.g. tetrahydrofuran and dioxane; polyalkylene glycols, e.g. polyethylene glycol and polypropylene glycol; alkylene glycols having 2-6 carbon atoms in the alkylene group, e.g. ethylene glycol, propylene glycol, butylene glycol, triethylene glycol, 1,2,6-hexanetriol, thiodiglycol, hexylene glycol, and diethylene glycol; glycerol; lower alkyl ethers of polyhydric alcohols, e.g. ethylene glycol methyl (or ethyl) ether, diethylene glycol methyl (or ethyl) ether, and triethylene glycol monomethyl (or monoethyl) ether; N-methyl-2-pyrrolidone; and 1,3-dimethyl-2-imidazolidinone. Of these alcohols, preferred are polyhydric alcohols such as diethylene glycol and lower alkyl ethers of polyhydric alcohols such as triethylene glycol monomethyl (or monoethyl) ether.

The content of the water-soluble organic solvent in the ink is in the range of generally 0 to 95%, preferably 10 to 80%, particularly preferably 20 to 50%, by weight.

The water content in the ink is chosen over a wide range depending on the nature and composition of the ink medium and desired characteristics of the ink, and generally is 10 to 100%, preferably 10 to 70%, particularly preferably 20 to 70%, by weight.

While the principal components of the ink according to the present invention are as described above, the primary characteristic of the invention is that the content of hydrophobic colloids in the ink is confined to 13 ppm or less, preferably 11 ppm or less.

According to the present inventors' study of the stability of ink compositions, dyes used in inks of the prior art, the dyes being produced primarily for the purpose of dyeing fiber, contain a variety of additives, e.g. surfactants and levelling agents, and further sodium chloride, sodium sulfate, and salts of alkaline earth metals, and these impurities are known to bring about various problems in ink-jet recording and recording with writing tools. The present inventors prepared ink compositions from dyes purified by removing these impurities as far as possible. These ink compositions, although capable of solving the above problems considerably, are not always satisfactory for preventing the deposition of foreign matter, specially on the heating heads in the ink-jet recording system utilizing thermal energy. As a result of further studies by the present inventors, it was found that commercial dyes contain considerable quantity (tens to hundreds of ppm) of various lyophobic colloids and these colloids are mainly responsible for the deposition of foreign matter on the heating heads, thus completing the present invention.

In other words, the inventors have found that the presence of a lyophobic colloid exceeding a certain concentration in ink promotes formation of precipitates during a prolonged storage, causing various troubles such as clogging of a discharge orifice of a recorder and especially deposit accumulation on a heating head surface of thermal-energy-actuated ink jet recorders.

The lyophobic colloids includes inorganic ion particles being in the form stabilized by the hydration due to the surface electric charge or in the form of metal-hydroxides or sulfides Since these colloids pass through the usual filter paper in general filtration treatment, no one has noticed up to now these lyophobic colloids. Such problems as the formation of a precipitate attributable to these colloids take place not during the production of an ink or immediately thereafter, but gradually with lapse of time at a prolonged storage, due to temperature variation, an action of an contaminant coming from the outside, or the ink pH changes. Therefore, it has been difficult to notice in an early stage, these phenomena attributable to the colloidal substances formed in inks. Such phenomena will usually be remarkable after inks are distributed on the market. Thus there have been great difficulties in taking measures against these problems Typical inorganic substances (metals) originating the lyophobic colloids are Cd, Cr, Pb, As, Hg, Zn, Ca, Mn, Fe, Al, Sn, and Cu. Besides these, S and P are included in such original substances, and silicates are principal components of the origin of the colloids.

Effective methods for removing such lyophobic colloids from dyes include one comprising sedimentation of these colloids by adding an electrolyte to a dye solution and one comprising sedimentation of these colloids by adding similarly a coagulating agent such as aluminum sulfate, ferrous sulfate, ferric chloride, ferric sulfate, sodium aluminate, or $[Fe_2(SO_4)_3 \cdot FeCl_3]$, and separating the resulting deposit by usual filtration. For completing practically useful inks, in addition to removal of the above-mentioned lyophobic colloids, it is preferable to combine the above sedimentation method with the ion exchange treatment, ultrafiltration membrane treatment, or reverse osmosis membrane treatment method, which is used conventionally for removal of inorganic salts. The lyophobic colloids in inks can be examined by atomic absorption photometry or the inductively coupled plasma emission spetral analysis. Also the method of determining the colloids precipitated with a coagulating agent or the like can be favorably applied for this purpose.

One of the methods for controlling the contents of the lyophobic colloids in inks has been described above, and the controlling method is not limited to this one. Any method is applicable herein as long as the lyophobic colloids can be removed thereby.

Water used for a constituent of ink is considered to be another source of lyophobic colloids.

This contamination can be avoided by using treated water, for example, water purified by distillation, ion exchange, or combination of these methods. A greatest source of lyophobic colloids contaminating inks is dyes used in the inks. In particular when dyes used are commercial products, markely large amounts of lyophobic colloids are often contained in the inks. For instance, a certain analysis known shows that lyophobic colloids amount to several hundred ppm based on a dye powder.

While the above description is given chiefly on the removal of lyophobic colloids, it is desirable in practice to remove them together with various inorganic salts such as sodium chloride and sodium sulfate or inorganic ions such as calcium ions and other metal ions.

Beside the basic constituents described above, the ink of the present invention is allowed, if necessary, to contain various known additives such as a dispersant, a surfactant (cationic, anionic, or nonionic), a viscosity modifier (e.g. polyvinyl alcohol, cellulosic compound, or water-soluble resins), a surface tension modifier (e.g. diethanolamine or triethanolamine), a pH conditioner (e.g. a buffer solution), and a mildewcide.

An inorganic salt such as lithium chloride, ammonium chloride, or sodium chloride is added as a resistivity modifier to inks which will be used in a type of ink-jet recording system wherein electric charge is given to a recording liquid. For use in a type of ink-jet recording system wherein a recording liquid is discharged by the action of thermal energy, thermal properties (e.g. specific heat, coefficient of thermal expansion, and heat conductivity) of the recording liquid are conditioned, if necessary.

The ink of the present invention, prepared as described above, sufficiently solves the problems of the prior art and is excellent and balanced as such in recording characteristics (signal response characteristic, stability of droplet formation, discharging stability, workability of continuous recording for many hours, and discharging stability after a long intermission), storage stability, fixing property on recording media, resistance of recorded images to light and weather, and so forth. Thus, the present ink is useful for various types of ink-jet recording system and for writing tools, particularly for the ink-jet recording system utilizing thermal energy wherein the formation of deposits from inks is a most undesirable matter.

The present invention is illustrated in more detail with reference to the following exmaples. Parts or % in the following examples refer to parts or % by weight. In these example, the term "water" unspecified means a deionized water unless otherwise noted.

EXAMPLE 1

Preparation of Ink

Sodium sulfate was added to a saturated aqueous solution, in which pure water was used, of a commercial dye (Direct Fast Yellow R, supplied by Sumitomo Chem. Ind. Co., Ltd.) with stirring to precipitate the dye. The precipitate was filtered, washed with a saturated aqueous solution of sodium sulfate, and dried. This dried solid was taken in such a prescribed amount to obtain dye concentration of 3% in the prepared ink, and was dissolved in a mixture of ethylene glycol and N-methyl-2-pyrrolidone (3:1). This resulting solution was filtered under pressure through a Teflon filter having an average pore diameter of 1 μm, and 60 parts of water was added to 40 parts of the filtrate with stirring to give an ink. Then, ferric chloride was added as a coagulating agent to this ink in a concentration of 0.5%. The mixture was thoroughly stirred, and then centrifuged for 5 min at 6,000 rpm. The resulting supernatant liquid was taken and passed through a layer of a cation exchange resin C-464 (supplied by Sumitomo Chem. Ind. Co., ltd.). The pH of the effluent was adjusted to 9.8 with an 0.1N aqueous NaOH, and left standing in a plastic container for 10 days. Then the resulting liquid was filtered again under pressure through a Teflon filter (average pore diameter 1 μm) to give an ink of the present invention. The content of lyophobic colloids in this ink was 11.8 ppm as calculated from the result of inductively coupled plasma emission spectral analysis and the result of quantifying the precipitate formed in the ink after standing.

This ink was tested for the following characteristics T1 to T5, where recording tests were conducted by using a recorder having on-demand type multiheads (discharge orifice diameter 35 μm, resistance of heat-generating resistor 150 ohm. driving voltage, 30 V, frequency 2 KHz) which afford thermal energy to inks therein to generate ink droplets to carry out recording. The results were good for all the characteristics T1 to T5.

(T1) Long-term stability: A sample of the ink was sealed in plastic bags, which was stored for 6 months at temperatures of −30° C. and 60° C.,separately. In both of the cases, neither insoluble matter nor change in physical properties including color was observed.

(T2) Discharging stability: A sample of the ink was continuously discharged for 24 hours at a room temperature, 5° C., and 40° C., separately. In all the cases, high quality images were obtained with extremely high stability throughout the recording period.

(T3) Discharging response characteristic: A sample of the ink was discharged at intervals of 2 sec and also discharged after being left for 2 months. In both the cases, none of the orifices were clogged and uniform records were steadily obtained.

(T4) Quality of recorded image: Using a sample of the ink, images were recorded on recording media shown later in Table 1. The recorded images showed high optical density and distinctness, and percentages of decrease in the optical density were 1% or less, after 6-month exposure to indoor light.

(T5) Fixing property on various recording media: Using a sample of the ink, images were recorded on recording media shown later in Table 1, and after 15 sec, the images were rubbed with a finger to check the aberration and spreading of each image. In all the cases, neither the aberration nor the spreading was observed; thus the ink showed superior fixing.

EXAMPLES 2–5

Inks were prepared in the same manner as in Example 1 by using commercial dyes shown later in Table 2. Each ink was tested for the characteristics T1 to T5 in the same manner as in Example 1. All the prepared inks showed superior results similarly to Example 1.

EXAMPLE 6

Inks of Examples 2, 3, 4, and 5 were tested as yellow, magenta, cyan, and black inks, respectively, for the characteristics T1 to T5 in the same manner as in Example 1 except that recording was conducted by using a recorder having an on-demand type head (discharge orifice diameter 50 μm, driving voltage for piezoelectric oscillators 60 V, frequency 4 KHz) which discharges ink droplets by means of piezoelectric oscillators to make a record. All these inks gave superior results.

EXAMPLE 7

Reproduction of a full-color photograph were made by using inks of Examples 2, 3, 4, and 5 as yellow, magenta, cyan, and black inks, respectively, and the same recorder as used in Examples 2–5. In the recorded image, each color was very clear and color reproduction was good.

EXAMPLE 8

Felt pens were filled separately with inks of four different colors prepared in Examples 2. Each pen, from which the cap was removed, was left standing for 10 days, and used for writing on paper. The writing was accomplished smoothly without becoming blurred.

COMPARATIVE EXAMPLE

Sodium sulfate was added to a saturated aqueous solution of the same kind of dye as used in Example 1 (Direct Fast Yellow R, supplied by Nihon Kayaku Co., Ltd.) with stirring to precipitate the dye. The precipitate was filtered, washed with a saturated solution of sodium sulfate in purified water, and dried. This dried solid was taken in such a prescribed amount that the dye concentration in the intended ink would be 3%, and was dissolved in a mixture of ethylene glycol and N-methyl-2-pyrrolidone (3:1). This solution was filtered under pressure through a Teflon (tradename) filter having an average pore diameter of 1 μm, and 60% of water was added to 40% of the filtrate with stirring to give a sample ink.

The content of lyophobic colloids in this ink was 19.6 ppm as measured and calculated by the same method as used in Example 1. This ink was tested, similarly to Example 1, for the characteristics T1 to T5. The results were as follows:

Referring to T1, insoluble matter appeared in the ink after one-month storage thereof.

Referring to T2, the discharge of the ink stopped frequently and it was obliged to change (raise) the driving voltage. A brown deposit adhering to the surface of heating heads was observed with a microscope.

Referring to T3, the ink, after one-month standing, caused clogging of orifices, and unstable discharging of the ink was observed.

Another ink was prepared by additional treatment of the above ink with a cation exchange resin, and still another ink was prepared by the standing treatment (the same as in Example 1) of the above ink. The content of lyophobic colloids was found to be 18.2 ppm in the former ink and 19.5 ppm in the latter ink. The tests for T1 and T5 indicated that these inks were improved as compared with the ink subjected no additional treatment but performance characteristics of these inks were not satisfactory for practical use.

TABLE 1

| Recording medium (tradename) | Grade of paper | Maker |
|---|---|---|
| Ginkan | High quality | Sanyo Kokusaku Pulp Co., ltd. |
| Seven Star | High quality | Hokuetsu Paper Mfg. Co., Ltd. |
| Hakubotan | Medium quality | Honshu Paper Mfg. Co., Ltd. |
| Toyo Filter Paper No. 4 | Non-sized | Toyo Roshi Co., Ltd. |

TABLE 2

| Example No. | Tradename of dye (maker) | Lyophobic colloid content in ink (ppm) |
|---|---|---|
| 2 | Water Yellow 6 (Orient Chem. Ind. Co., ltd.) | 11.2 |
| 3 | Chuganol Fast Red 3B (Chugai Kasei Co., Ltd.) | 9.2 |
| 4 | Kayarus Turqoise Blue GL (Nihon Kayaku Co., Ltd.) | 11.8 |
| 5 | Special Black 7984 (Bayer A.G.) | 7.6 |

What is claimed is:

1. A liquid composition containing a water-soluble dye and a solvent, wherein said liquid composition has a lyophobic colloid concentration of 3 ppm or less.

2. A liquid composition according to claim 1, wherein the solvent comprises water.

3. A liquid composition according to claim 1, wherein the solvent is a mixture of deionized water and a water-soluble organic solvent.

4. A liquid composition according to claim 1, wherein the water-soluble dye is contained at a concentration in the range of from 0.1 to 20% by weight.

5. A liquid composition according to claim 1, wherein the lyophobic colloid concentration is 11 ppm or less.

6. A process for producing a liquid recording composition, comprising:
producing a liquid composition containing a water-soluble dye, wherein said liquid composition is contaminated with lyophobic colloids, the concentration of said lyophobic colloids being in excess of 13 ppm; and
purifying said unpurified liquid composition such that the concentration of lyophobic colloids is 13 ppm or less.

7. The process according to claim 6, further including the step of including water in said purified liquid composition.

8. The process according to claim 6, further including the step of including deionized water and a water-soluble organic solvent in said purified liquid composition.

9. The process according to claim 6, further including the step of including the water-soluble dye in said liquid composition in the range of from 0.1 to 20% by weight.

10. The process according to claim 6, further including the step of further purifying said liquid composition such that the concentration of lyophobic colloids is 11 ppm or less.

* * * * *

UNITED STATES PATENT AND TRADEMARK OFFICE
CERTIFICATE OF CORRECTION

PATENT NO. : 4,778,525
DATED : October 18, 1988
INVENTOR(S) : MASATSUNE KOBAYASHI, ET AL.   Page 1 of 1

It is certified that error appears in the above-identified patent and that said Letters Patent is hereby corrected as shown below:

COLUMN 2

Line 14, "object, it" should read --object. It--.

COLUMN 7

Line 13, "T1to" should read --T1 to--.
Line 33, "T1 and T5" should read --T1 to T5--.

COLUMN 8

Line 16, "3 ppm" should read --13 ppm--.

Signed and Sealed this

Eighteenth Day of April, 1989

Attest:

DONALD J. QUIGG

*Attesting Officer*   Commissioner of Patents and Trademarks